(12) United States Patent
Ruiz

(10) Patent No.: US 8,903,806 B2
(45) Date of Patent: Dec. 2, 2014

(54) MATCHING QUERIES TO DATA OPERATIONS USING QUERY TEMPLATES

(75) Inventor: Marcelo L. Ruiz, Kirkland, WA (US)

(73) Assignee: Microsoft Corporation, Redomnd, WA (US)

( * ) Notice: Subject to any disclaimer, the term of this patent is extended or adjusted under 35 U.S.C. 154(b) by 87 days.

(21) Appl. No.: 12/965,162

(22) Filed: Dec. 10, 2010

(65) Prior Publication Data

US 2012/0150842 A1 Jun. 14, 2012

(51) Int. Cl.
*G06F 7/00* (2006.01)
*G06F 17/30* (2006.01)

(52) U.S. Cl.
CPC .............................. *G06F 17/30392* (2013.01)
USPC .......................................... 707/718; 707/719

(58) Field of Classification Search
None
See application file for complete search history.

(56) References Cited

U.S. PATENT DOCUMENTS

| | | | | |
|---|---|---|---|---|
| 7,668,812 B1 * | 2/2010 | Riley et al. | ..................... | 707/754 |
| 7,690,037 B1 * | 3/2010 | Hartmann | ....................... | 726/23 |
| 7,783,644 B1 * | 8/2010 | Petrou et al. | ................... | 707/748 |
| 2001/0047355 A1 * | 11/2001 | Anwar | ............................... | 707/5 |
| 2003/0069880 A1 * | 4/2003 | Harrison et al. | ................... | 707/3 |
| 2003/0204514 A1 * | 10/2003 | Owens et al. | ................. | 707/100 |
| 2004/0225643 A1 * | 11/2004 | Alpha et al. | ....................... | 707/3 |
| 2004/0249808 A1 * | 12/2004 | Azzam et al. | ....................... | 707/4 |
| 2005/0010565 A1 * | 1/2005 | Cushing et al. | ................... | 707/3 |
| 2005/0015356 A1 * | 1/2005 | Ireland et al. | ....................... | 707/1 |
| 2005/0028134 A1 * | 2/2005 | Zane et al. | .................... | 717/106 |
| 2005/0182758 A1 * | 8/2005 | Seitz et al. | ........................ | 707/3 |
| 2005/0192921 A1 * | 9/2005 | Chaudhuri et al. | ................ | 707/1 |
| 2005/0203897 A1 * | 9/2005 | Kapitskaia et al. | ................ | 707/3 |
| 2006/0036989 A1 * | 2/2006 | Chaudhuri et al. | ............ | 717/101 |
| 2007/0011183 A1 * | 1/2007 | Langseth et al. | .............. | 707/101 |
| 2007/0061191 A1 * | 3/2007 | Mehrotra et al. | ............... | 705/11 |
| 2007/0112727 A1 * | 5/2007 | Jardine et al. | ...................... | 707/3 |
| 2007/0174335 A1 * | 7/2007 | Konig et al. | ............... | 707/104.1 |
| 2007/0192351 A1 * | 8/2007 | Liu et al. | ......................... | 707/102 |
| 2007/0282916 A1 * | 12/2007 | Albahari et al. | .............. | 707/200 |
| 2008/0195577 A1 * | 8/2008 | Fan et al. | ........................... | 707/2 |
| 2008/0263019 A1 * | 10/2008 | Harrison et al. | ................... | 707/4 |

(Continued)

OTHER PUBLICATIONS

GlobeTP: Template-Based Database Replication for Scalable Web Applications, Groothuyse et al., WWW 2007/Track: Performance and Scalability, Session: Scalable Systems for Dynamic Content, 2007.*

(Continued)

*Primary Examiner* — Augustine K Obisesan
(74) *Attorney, Agent, or Firm* — Nicholas Chen; Doug Barker; Micky Minhas

(57) ABSTRACT

Systems and methods are described herein that can implemented by a middle tier of a multi-tier data retrieval system to select data operation(s) that correspond to a query. The query may be received from a front tier. The selection is performed by comparing the query to a query template associated with each data operation. The query template for each data operation includes an algebraic description of queries that each respective data operation can satisfy. The selected data operation(s) are then executed against a data service to obtain data, which is then provided to the front tier. In some embodiments, an execution plan may be created by the middle tier for satisfying the query. The execution plan can include the selected data operation(s) and post-processing step(s). The post-processing step(s) can be applied to the obtained data to satisfy the query. The post-processed data is then provided to the front tier.

20 Claims, 5 Drawing Sheets

(56) References Cited

U.S. PATENT DOCUMENTS

| | | | |
|---|---|---|---|
| 2008/0301135 A1 | 12/2008 | Alves et al. | |
| 2009/0106321 A1* | 4/2009 | Das et al. | 707/200 |
| 2009/0299986 A1* | 12/2009 | Peterson | 707/4 |
| 2010/0005056 A1* | 1/2010 | Bayliss | 707/2 |
| 2010/0250518 A1 | 9/2010 | Bruno et al. | |

OTHER PUBLICATIONS

Answering Queries Using templates with binding patterns, Rajaraman et al, Proceedings of the fourteenth ACM SIGACT-SIGMOD-SIGART symposium on Principles of database system, pp. 105-112, 1995.*

Polyviou, et al., "PALLAS: A querying interface for pervasive computing using handheld devices", Retrieved at <<http://citeseerx.ist.psu.edu/viewdoc/download?doi=10.1.1.63.1597&rep=rep1&type=pdf >>, International Conference on Parvaslve Services, 2004, pp. 10.

Zhou et al., "Data-oriented Content Query System: Searching for Data into Text on the Web", Retrieved at << http://www.wsdm-conference.org/2010/proceedings/docs/p121.pdf >>, Feb. 4-6, 2010. pp. 121-130.

Ciravegna, et al., "FACILE: Classifying Texts Integrating Pattern Matching and Information Extraction", Retrieved at http://www.ofai.at/~johannes.matiasek/papers/ijcai99.pdf >>, Proceedings of the 16th International Joint Conference on Artificial Intelligence, Aug. 1999, 6 pages.

Skkonnard, Aaron, "A Guide to Designing and Building RESTful Web Services with WCF 3.5", Retrieved at <<http://msdn.microsoft.com/en-us/library/dd203052(printer).aspx>>, Oct. 2008, pp. 1-49.

"Signature Engines", Retrieved at << http://www.cisco.com/en/US/docs/security/ips/6.1/configuration/guide/cli/cli_signature_engines.html >>, Retrieved Oct. 4, 2010, 4 pages.

"OSC", Retrieved at <<http://opensoundcontrol.org/book/export/html/1>>, Jul. 18, 2007, pp. 19.

"Matching Natural Language Multidomain Queries to Search Services", Retrieved at <<http://dbgroup.como.polimi.it/brambilla/sites/dbgroup.como.polimi.it.brambilla/files/thesis/Thesis_smallsize.pdf>>, 2008-2009, 96 pages.

\* cited by examiner

MATCHING QUERIES TO DATA OPERATIONS USING QUERY TEMPLATES

BACKGROUND

Today's information technology professionals often use data retrieval systems having an n-tier, such as a three-tiered, architecture. By separating the different tiers, each tier can be managed, upgraded, and used independently of each other. A typical three-tier data retrieval system may include a front tier, a middle tier, and a back tier. The front tier typically interfaces to a user and can receive and/or generate queries for data. The middle tier typically processes queries received from the front tier and translates them into a form that the back tier can process. The back tier typically consists of some combination of database servers that respond to data operations such as queries or stored procedures, and web services that respond to web service operations. In particular, the middle tier typically translates queries received from the front tier into database or web service operations (collectively referred to herein as "data operations") that are executed by the back tier to obtain data. The middle tier then sends the obtained data back to the front tier. The middle tier thus interfaces with the front tier, e.g., a client computer, and the back tier, e.g., one or more database servers or web services.

However, typical approaches used by the middle tier to translate queries received from the front tier into data operations that can be executed by the back tier are somewhat cumbersome. A typical translation technique may only use one-to-one matching of front-tier queries to data operations. For example, a typical approach may directly translate one front-tier query to one data operation. As a result, the front-tier queries can have little, if any, variation, thus limiting their functionality and usefulness. Furthermore, these typical approaches require that the front tier present queries using a limited and rigid syntax that can be easily translated by the middle tier using the one-to-one mapping.

As a result, typical approaches may not be able to compensate for any variations in the front tier query. In fact, these approaches limit the capability of the front tier to compose queries that have any variations. Even approaches that attempt to give the front tier more flexibility in composing queries still only use limited and inflexible mappings between queries and data operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Systems and methods for matching queries to data operation(s) using query templates are described herein. In accordance with certain embodiments, such systems and methods may be implemented by a middle tier of a three-tier data retrieval system to select data operation(s) that correspond to a query. The query, received from a front tier, can access a data service in the back tier. Selection of data operation(s) is made by comparing the query to a query template associated with each data operation. The query template for each data operation includes an algebraic description of queries that each respective data operation can satisfy. The selected data operation(s) are then executed against a data service to obtain data, which is then provided to the front tier. In some embodiments, an execution plan may be created by the middle tier for satisfying the query. The execution plan can include the selected data operation(s) and post-processing step(s). The post-processing step(s) can be applied to the obtained data to satisfy the query. The post-processed data is then provided to the front tier.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
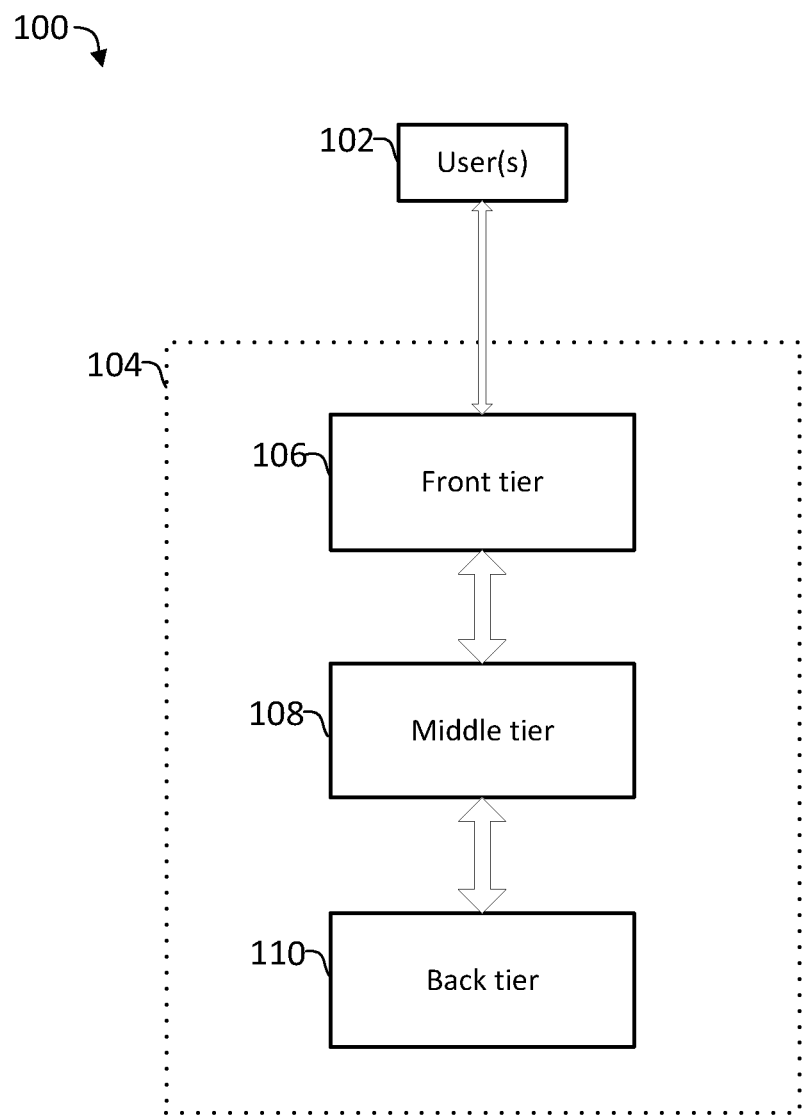
FIG. 1 is a block diagram of an example three-tier data retrieval system that is configured to match queries to data operations using query templates in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

A system for matching queries to data operation(s) using query templates is described herein. In accordance with certain embodiments, such system may be implemented by a middle tier of an n-tier data retrieval system (such as a three-tier data retrieval system) to select data operation(s) that correspond to a query. The query, received from a front tier, can access a data service in the back tier. The selection of data operation(s) is made by comparing the query to a query template associated with each data operation. The query template for each data operation includes an algebraic description of queries that each respective data operation can satisfy. The use of query templates associated with each data operation advantageously allows a variety of queries to match the data operations. In certain embodiments, query templates with optional operators and operators and values that can be extracted from a query may be used to provide additional flexibility. The selected data operation(s) are then executed against a data service to obtain data, which is then provided to the front tier.

In some embodiments, an execution plan may be created by the middle tier for satisfying the query. The execution plan can include the selected data operation(s) and one or more post-processing steps. The selected data operation(s) can be executed against the data service to obtain data that only partially satisfies the query. The post-processing step(s) can then be applied to the obtained data to substantially fully satisfy the query. The post-processed data is then provided to the front tier.

II. Example Data Retrieval System

FIG. 1 is a block diagram 100 of an example three-tier data retrieval system 104 that is configured to match queries to data operations using query templates. Block diagram 100 of FIG. 1 illustrates one or more users 102 and data retrieval system 104. User(s) 102 may interface with data retrieval system 104. For example, user(s) 102 may pose queries to data retrieval system 104. Data retrieval system 104 can process the queries and return results to the queries to user(s) 102, such as by executing the queries against a data service. In one embodiment, user(s) 102 may include people that use a personal computer or other computing system or device. User(s) 102 may also cause application(s) to be executed by a front tier 106 of data retrieval system 104 to generate the queries.

Data retrieval system 104 may be implemented using an n-tier architecture, such as a three-tier architecture. Data retrieval system 104 may include a front tier 106, a middle tier 108, and a back tier 110. In one embodiment, three tiers 106, 108, and 110 may be logical tiers (also referred to as layers) that are implemented on a single computing system or device. In another embodiment, one or more of three tiers 106, 108, and 110 of data retrieval system 104 may be each implemented using a separate computing system or device. In various embodiments and examples presented herein, three-tier data retrieval system 104 is described. However, the scope of the example embodiments is not limited to three-tier data retrieval systems. For example, another type of an n-tier data retrieval system can be used that has more logical and/or physical tiers.

In one embodiment, front tier 106 may include a user interface, such as graphical user interface (GUI), that allows a user to compose or select a query. In another embodiment, front tier 106 may execute an application that generates the query. Middle tier 108 may include query processing logic that processes the query received from front tier 106. Middle tier 108 may select one or more data operations that correspond to the query, such as by comparing the query to a query template associated with each data operation. Embodiments for selecting data operation(s) that correspond to the query are described below.

Middle tier 108 then passes the selected data operation(s) to back tier 110 to be executed. Back tier 110 may comprise, for example, a database server and one or more databases associated therewith or one or more web services, although these examples are not intended to be limiting. Back tier 110 executes the selected data operation(s) to obtain data and then passes the obtained data to middle tier 108. Middle tier 108 may perform one or more post-processing functions on the obtained data in order to satisfy the query. Embodiments for selecting or identifying post-processing function(s) for satisfying the query are described below. Middle tier 108 then returns the obtained and/or post-processed data to front tier 106. An interface, such as a graphical user interface (GUI), implemented by front tier 106 may present the obtained and/or post-processed data to user(s) 102. Also, an application that initially requested this data (e.g., by generating the query) on front tier 106 may use the obtained and/or post-processed data.

Figure 2:
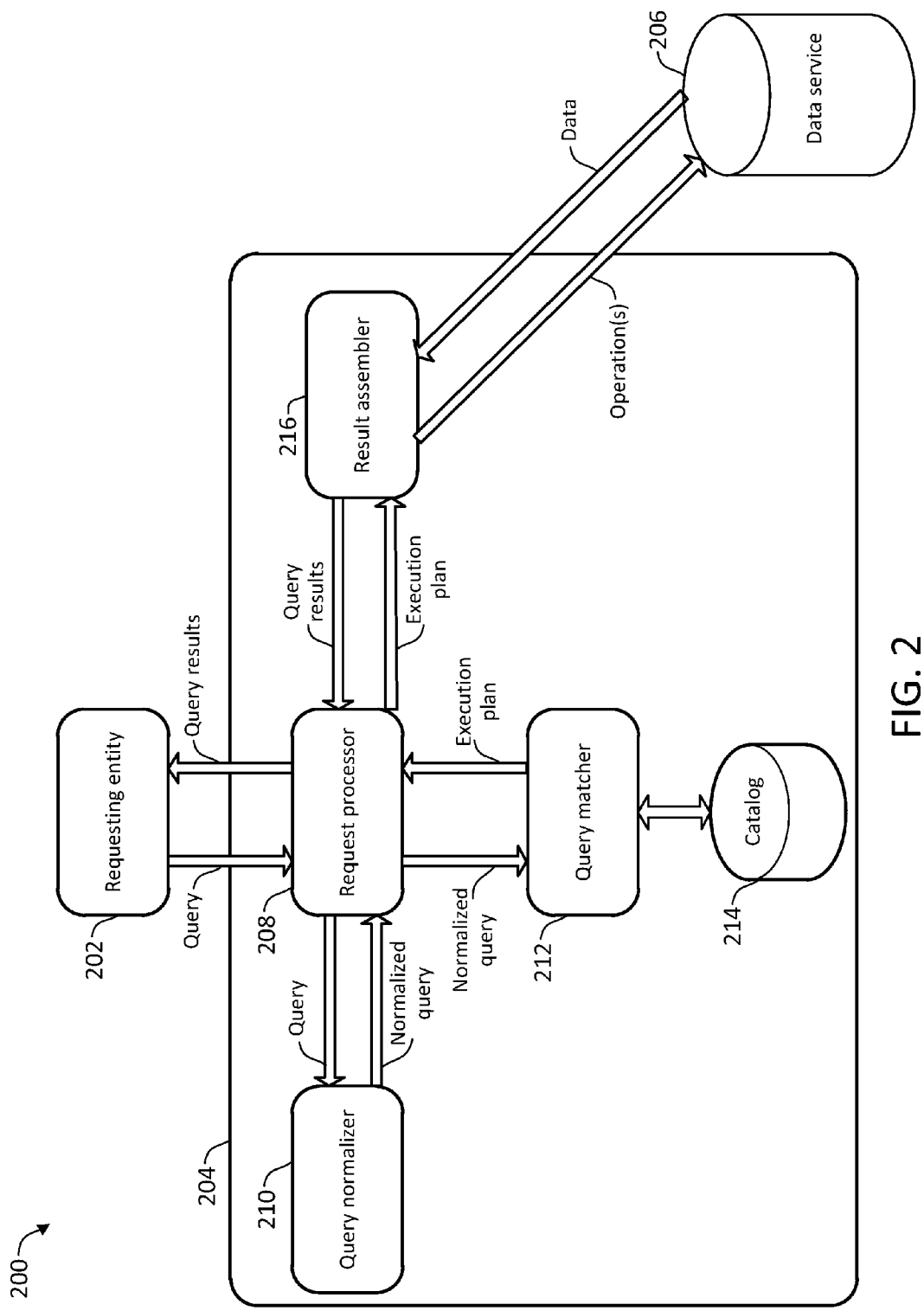
FIG. 2 is a detailed block diagram of an example three-tier data retrieval system that is configured to match queries to data operations using query templates in accordance with an embodiment.

In embodiments, data operation(s) may be selected based on the query in various ways. For instance, FIG. 2 is a detailed block diagram of an example three-tier data retrieval system 200 that is configured to match queries to data operations using query templates in accordance with an embodiment. Data retrieval system 200 includes a requesting entity 202, a middle tier 204, and a data service 206. Requesting entity 202 is an example of a front tier, such as front tier 106 of FIG. 1, and it may interface with user(s) 102. Middle tier 204 is an example of middle tier 108 of FIG. 1. Data service 206 is an example of a back tier, such as back tier 110 of FIG. 1.

A. Requesting Entity

Requesting entity 202 is intended to broadly represent any system or device capable of generating a query and providing it to middle tier 204. In one embodiment, a user may interact with an application executing on requesting entity 202 in order to generate the query. For example, a user may interact with an application that executes in the context of a Web browser, e.g., where requesting entity 202 includes the application and the web browser. The application may cause the Web browser to generate a query in a Uniform Resource Location (URL) form. The query in URL form may then be converted to a form that can be provided to middle tier 204 by a Web services component, such as a Windows Communication Foundation (WCF) services component. The query is then provided to middle tier 204 by requesting entity 202.

In another embodiment, requesting entity 202 may execute an application that automatically generates a query at runtime. For example, the application may include a query that is written (i.e., hard-coded) into the application during development thereof using C, C++, C#, Java, and/or any other programming language known in the art. During compilation of the application, the hard-coded query may be automatically converted into a form that can be submitted to middle tier 204. During execution of the compiled application, the query can then be automatically submitted to middle tier 204 as necessary to carry out the functionality of the application.

In another embodiment, requesting entity 202 may execute an application that allows a user to dynamically compose and submit a query to middle tier 204 at run-time. Still other methods used by requesting entity 202 to generate the query are contemplated, and the scope of the example embodiments is not limited to the examples described above.

Middle tier 204 processes the query received from front tier 202 in a manner that will be described below to obtain data from data service 206 and returns query results that include the obtained data to requesting entity 202. Requesting entity 202 may then use the query results, such as by presenting the query results to user(s) (such as user(s) 102) via a suitable interface and/or using the query results in an application that generated the query.

The query received by middle tier 204 may be expressed using one or more of various protocols used for presenting queries, such as Standard Query Language (SQL), Language Integrated Query (LINQ), Extensible Markup Language Query (XML Query or XQuery), etc. In various embodiments and examples presented herein, LINQ form(s) of the query are described, but the scope of the example embodiments is not limited in this respect.

In one embodiment, the query may be represented using a data structure known in the art as a LINQ expression tree. For example, in one embodiment, the query is represented as a LINQ expression tree that includes a root node that points to the query and one or more child nodes, connected to the root node, that contain body and/or parameters of the query. However, this is only an example and other data structures and forms may be used to represent the query.

B. Middle Tier

As further shown in FIG. 2, middle tier 204 includes a plurality of interconnected components including a request processor 208, a query normalizer 210, a query matcher 212, a catalog 214, and a result assembler 216. These components may comprise, for example, software modules executing upon a single computing device or, alternatively, software modules distributed across and executing upon separate but connected computing devices.

Middle tier 204 receives a query from requesting entity 202. Middle tier 204 processes the query in a manner to be described below, wherein such processing includes selecting one or more data operations from among a fixed set of data operations that correspond to the query. Middle tier 204 executes the selected data operation(s) against data service 206 and receives data from data service 206 in response to the execution of the selected data operation(s). Middle tier 204 is configured to return query results to requesting entity 202 that includes the obtained data.

1. Request Processor

Request processor receives a query from requesting entity 202. Request processor 208 forwards the query to query normalizer 210 for application of a normalization process thereto. Query normalizer returns a normalized version of the query (referred to herein as the normalized query) to request processor 208. Request processor 208 then forwards the normalized query to query matcher 212. Query matcher 212 returns an execution plan to request processor 208, wherein the execution plan includes one or more data operations to be executed against data service 206 that are selected based on the normalized query. Request processor 208 then forwards the execution plan to result assembler 216. Result assembler 216 executes the selected data operation(s) against data service 206 to obtain data. Result assembler 216 transmits query results that include the obtained data to request processor 208. Request processor 208 then forwards query results that include the obtained data received from result assembler 216 to requesting entity 202.

In one embodiment, the execution plan generated by query matcher 212 also includes one or more post-processing functions in addition to the selected data operation(s) to be executed against data service 206. The post-processing function(s) are to be performed on the data obtained from data service 206 to satisfy the query. In accordance with this embodiment, request processor 208 forwards the execution plan that includes the post-processing function(s) and the data operation(s) to result assembler 216.

2. Query Normalizer

Query normalizer 210 normalizes the query received from request processor 208 by generating a representation of the query that accords with a standard or canonical query form. The generated representation is referred to herein as the normalized query. This normalized query is then returned to request processor 208. By performing the normalization function, query normalizer 210 ensures that query matcher 212 will return consistent results (i.e., will select the same one or more data operations) for equivalent queries that request the same data but that are expressed in different forms. Example normalization operations that may be performed by query normalizer 210 when the query is expressed as a LINQ expression may include reordering the expressions of binary operators so that they are handled consistently or merging consecutive filtering (e.g., .Where( )) calls into a single call, joining them into a conjunctive (AND'ed) form. If query normalizer 210 determines that the query received from request processor 208 does not require modification to be placed in the standard or canonical form, then the normalized query passed by query normalizer 210 back to request processor 208 may be the same as the original query.

3. Query Matcher

Query matcher 212 receives the normalized query from request processor 208. Query matcher 212 is configured to select one or more data operations that correspond to the normalized query from among a fixed set of data operations by comparing the normalized query to a query template associated with each data operation. In one embodiment, query matcher 212 creates an execution plan that includes the selected data operation(s). The selected data operation(s) can be executed against a data service (e.g., data service 206) to obtain data that fully satisfies the normalized query. In another embodiment, query matcher 212 creates an execution plan that includes the selected data operation(s) and one or more post-processing steps. In accordance with this embodiment, the selected data operation(s) that are executed against data service 206 obtain data that only partially satisfy the normalized query. However, the post-processing step(s) can then be applied to the obtained data to fully satisfy the normalized query. In accordance with both embodiments, the execution plan is transmitted to request processor 208 for forwarding to result assembler 216.

As noted above, query matcher 212 selects data operation(s) from among a fixed set of data operations based on the normalized query. In particular, query matcher 212 accesses catalog 214 that stores a set of query templates, wherein each query template is associated with a data operation in the fixed set of data operations. Each query template comprises an algebraic description of queries that the associated data operation can satisfy. Query matcher 212 then selects one or more data operations that match the normalized query based on the query template(s) associated with each data operation. In one embodiment, the catalog may contain additional information about the data operations, for example an associated cost estimate. Query matcher 212 may utilize this information to minimize the cost of the selected data operation(s).

To facilitate matching, each query template may be specified using a language or format that is substantially similar to that used to represent the normalized query. For example, in an embodiment in which the normalized query is expressed using a LINQ expression, each of the query templates may also be expressed as a LINQ expression. Furthermore, in an embodiment in which the normalized query is represented using a LINQ expression tree, each of the query templates may be represented by a LINQ expression tree.

Query matcher 212 selects those data operation(s) from among the fixed set of data operations that are associated with query templates that are deemed to best match the normalized query. In accordance with certain embodiments, query matcher 212 performs this function by evaluating similarities between a LINQ expression or LINQ expression tree that represents the normalized query and each of a plurality of LINQ expressions or LINQ expression trees that represent the query templates associated with the data operations. This may involve, for example, evaluating similarities between the content of nodes of a LINQ expression tree that represents the normalized query and the content of corresponding nodes of a LINQ expression tree associated with each data operation. Persons skilled in the relevant art(s) will appreciate that a number of alternative methods for matching tree structures may also be used. Furthermore, in certain embodiments, query matcher 212 may use a set of rules to drive the matching process. Additional query template operators in query template algebraic descriptions may allow query matcher 212 to match a wider set of normalized queries and to extract information from them.

Examples of the matching process performed by query matcher 212 will now be provided. These examples will be described in reference to an embodiment in which the normalized query and query templates are represented using LINQ expressions. However, the scope of the example embodiments is not limited in this respect. For example, the normalized queries and query templates described below may also be represented using LINQ expression trees, and query matcher 212 may use an analogous selection process to the one described.

For example, the normalized query may be represented by the LINQ expression:

[Customers], which is intended to obtain a list of all customers from data service 206. Query matcher 212 may receive the above normalized query in either the form shown, and/or as a LINQ expression tree. Query matcher 212 may compare the normalized query to each of the query templates stored in catalog 214. Such query templates may include a query template for the following data operation:

List<Customer>GetAllCustomers( ), wherein the associated query template is a LINQ expression of the form:

GetAllCustomers:[Customers].

In accordance with the above example, query matcher 212 may select the List<Customer>GetAllCustomers( ) data operation from among the fixed set of data operations based on the comparison of the [Customers] LINQ expression of the normalized query to the GetAllCustomers:[Customers] LINQ expression of the query template associated with the List<Customer>GetAllCustomers( ) data operation. In this example, when the selected data operation of List<Customer>GetAllCustomers( ) is executed against data service 206, data will be returned that satisfies the normalized query. Thus, in accordance with this example, query matcher 212 can select a single data operation from among the fixed set of data operations that can be executed against data service 206 to satisfy the normalized query [Customers]. It is noted that in certain embodiments, query matcher may select two or more data operations from among the fixed set of data operations that, when executed against data service 206, will satisfy the normalized query.

i. Post-Processing Function(s)

In one embodiment, query matcher 212 may select data operation(s) from among the fixed set of data operations that only partially satisfy the normalized query. In other words, the data returned from data service 206 responsive to execution of the selected data operation(s) will not fully satisfy the normalized query. For example, such returned data may comprise more data than the normalized query was intended to obtain and/or data that is sorted in a different order than that specified by the normalized query. In one embodiment, query matcher 212 may identify one or more post-processing functions to be applied by result assembler 216 on data obtained by executing the selected data operation(s) against the data service. These post-processing function(s) may be identified as part of the execution plan that is provided by query matcher 212 to request processor 208, along with an identification or description of the selected data operation(s).

By way of example, the normalized query may be represented by the LINQ expression:

[Customers].Where(c=>c.ID=="MSFT"), which is intended to obtain a list of all customers having a customer identifier of "MSFT" from data service 206. Query matcher 212 may receive the above normalized query in either the form shown, and/or as a LINQ expression tree. Query matcher 212 may compare the normalized query to each of the query templates stored in catalog 214. Such query templates may include a query template for the following data operation:

List<Customer>GetAllCustomers( ), wherein the associated query template is a LINQ expression of the form:

GetAllCustomers:[Customers].

In accordance with the above example, query matcher 212 may select the List<Customer>GetAllCustomers( ) data operation from among the fixed set of data operations based on the comparison of the [Customers].Where (c=>c.ID=="MSFT") LINQ expression of the normalized query to the GetAllCustomers:[Customers] LINQ expression of the query template associated with the List<Customer>GetAllCustomers( ) data operation. In this example, when the selected data operation of List<Customer>GetAllCustomers( ) is executed against data service 206, data will be returned that will not fully satisfy the normalized query. Therefore query matcher 212 may identify one or more post-processing functions to be performed on the data obtained from data service 206 by result assembler 216 to satisfy the normalized query. In accordance with this example, the identified post-processing function(s) may filter the data obtained from data service 206 based on execution of the selected data operation of List<Customer>GetAllCustomers( ) to generate a subset of that data that contains a list of customers having a customer identifier of "MSFT," thus satisfying the normalized query.

In another example, the normalized query may be represented by the LINQ expression:

[Customers].Where(c=>c.ID=="MSFT").SelectMany (c=>c.Orders), which is intended to obtain a list of all orders for all customers having a customer identifier of "MSFT" from data service 206. Query matcher 212 may receive the above normalized query in either the form shown, and/or as a LINQ expression tree. Query matcher 212 may compare the normalized query to each of the query templates stored in catalog 214. Such query templates may include query templates for the following data operations:

List<Customer>GetAllCustomers( ) and
List<Customer>GetAllOrders( )

wherein the respective associated query templates are LINQ expression of the form:

GetAllCustomers:[Customers], and
GetAllOrders:[Orders].

In accordance with the above example, query matcher 212 may select the List<Customer>GetAllOrders( ) data operation from among the fixed set of data operations based on the comparison of the [Customers].Where(c=>c.ID=="MSFT").SelectMany(c=>c.Orders) LINQ expression of the normalized query to the GetAllOrders:[Orders] LINQ expression of the query template associated with the List<Customer>GetAllOrders( ) data operation. For example, query matcher 212 may select the List<Customer>GetAllOrders( ) data operation over the other data operations in the fixed set of data operations based on several matching factors, including how close the LINQ expression of the query template associated with this data operation matches the LINQ expression of the normalized query. In this example, when the selected data operation of GetAllOrders:[Orders] is executed against data service 206, data will be returned that will not fully satisfy the normalized query. Therefore query matcher 212 may identify one or more post-processing functions to be performed on the data obtained from data service 206 by result assembler 216 to satisfy the query. In accordance with this example, the identified post-processing function(s) may filter the data obtained from data service 206 based on execution of the selected data operation of GetAllOrders:[Orders] to obtain a subset of that data that contains all orders for the list of customers with a customer identifier of "MSFT," thus satisfying the query.

ii. Query Template Operators that Indicate Optionality

In one embodiment, query matcher 212 may compare the normalized query to a query template that includes an operator that indicates optionality. Query matcher 212 ascertains whether or not the query template with the operator that indicates optionality matches the normalized query. The operator that indicates optionality is used to indicate that an element of a query template is to be deemed optional during matching, meaning that the normalized query need not include the optional element in order to be deemed matching. The use of query templates that include operators that indicate optionality advantageously enables a query template to be defined that will match up with many different variations of the same query, wherein the variations are premised on the inclusion or exclusion of certain optional elements, such as optional parameters.

Any of a variety of suitable operators may be used to indicate optionality within a query template depending upon the implementation. For example, in certain embodiments, a .Where( ) element of a query template expressed as a LINQ expression may be identified as optional by expressing the .Where( ) element as an .OptionalWhere( ) element, wherein the indicator of optionality is the inserted "Optional" text. However, this is merely one example. Persons skilled in the relevant art(s) will readily appreciate that any number of other operators may be used.

iii. Query Templates with Extraction Elements

In one embodiment, query matcher 212 compares the normalized query to a query template that includes at least one extraction element. As referred to herein, an extraction element is a part of a query template that is specified in a manner that indicates to the query matcher 212 that the element should be replaced with a particular value or operator extracted from the normalized query prior to matching. During the selection process performed by query matcher 212, query matcher 212 will extract the value, operator or information element (such as the name of a property element or a sequence of property element references) in the normalized query that is identified by the extraction element and then replace the extraction element with the extracted value, operator or information element. This feature enables query templates to be defined in a flexible manner that allows elements of the template to be defined in reference to corresponding elements of the normalized query.

For example, the normalized query may be represented by the LINQ expression:

[Customers].Where(c=>c.ID=="MSFT").SelectMany
  (c=>c.Orders).OrderBy(o=>o.Date), which is intended to obtain a list of all orders for all customers having a customer identifier of "MSFT" from data service 206, wherein the list of orders is to be returned sorted by date. Query matcher 212 may receive the above normalized query in either the form shown, and/or as a LINQ expression tree. Query matcher 212 may compare the query to each of the query templates stored in catalog 214. Such query templates may include a query template for the following data operation:

List<Order>GetOrdersForCustomer(string customerID), wherein the associated query template is a LINQ expression of the form:

GetOrdersForCustomer:[Customers].Where
  (c=>c.ID==ExtractConstantForParam("customerID")).
  SelectMany(c=>c. Orders).

In accordance with the above example, query matcher 212 may select the List<Order>GetOrdersForCustomer (string customerID) data operation from among the fixed set of data operations based on the comparison of the LINQ expression of the normalized query to the LINQ expression of the query template associated with the respective data operation. In this example, the element Where (c=>c.ID==ExtractConstantForParam("customerID")) in the query template includes the extraction element ExtractConstantForParam("customerID"). During the selection process, query matcher 212 extracts the parameter "customerID" from the normalized query, which in this case may be "MSFT." Once this parameter is extracted from the query, it can be used as a part of the respective query template. In accordance with this example, the query template after extraction and replacement is: GetOrdersForCustomer: [Customers]. Where(c=>c.ID=="MSFT").SelectMany (c=>c.Orders). In other words, the extraction element ExtractConstantForParam is replaced with of the constant "MSFT" which is extracted from the normalized query. Query matcher 212 then continues with the selection process using the query template that includes the extracted constant. Query matcher 212 may record information about the extraction occurrence in the execution plan. For example, query matcher 212 may configure a designated element of a description of the execution plan with a corresponding element extracted from the query or provided by the query template associated with a selected data operation.

It is noted that in accordance with certain embodiments query templates may be defined that include any combination of the above features. For example, query templates may be defined that use one or more extraction elements in conjunction with one or more optional elements.

iv. Null Match

In one embodiment, query matcher 212 may determine that there are no data operation(s) from the fixed set of data operations that can fully satisfy the normalized query and may further determine that there are no available post-processing function(s) that can be applied to data obtained from data service 206 to fully satisfy the query. For example, in certain embodiments, certain post-processing function(s) may not be made available due to a determination by developers or administrators of middle tier 204 that such post-processing function(s) are too expensive or otherwise undesirable to perform. In this case, query matcher 212 may return a result to request processor 208 indicating that the normalized query cannot be performed and that result may be passed back to requesting entity 202. Alternatively, query matcher 212 may return an execution plan to request processor 208 that, when executed by result assembler 216, will result in the production of query results that do not fully satisfy the originally-submitted query. These query results may then be passed back to requesting entity 202 by request processor 208.

4. Catalog

In one embodiment, catalog 214 stores a fixed set of data operations and associated query templates. In another embodiment, catalog 214 only stores query templates associated with the fixed set of data operations and the fixed set of data operations are stored in, and ready to be executed by, result assembler 216. The fixed set of data operations and associated query templates stored in catalog 214 may be defined by administrators and/or developers of middle tier 204 or by some other entity. In one embodiment, catalog 214 may store a set of data operations that is modified over time by developers or by some other entity. In another embodiment, catalog 214 may not store associated query templates but instead derive them from other information, such as a set of conventions on data operation names.

It is noted that although catalog 214 is shown in FIG. 2 as a logically distinct component, an implementation may combine catalog 214 with another component of data retrieval system 200. For example, an implementation may integrate catalog 214 directly into query matcher 212 or may store catalog 214 inside data service 206 itself.

5. Result Assembler

Result assembler 216 receives the execution plan from request processor 208. The execution plan may contain selected data operation(s) to be executed against data service 206 to obtain data. In one embodiment, result assembler 216 includes the fixed set of data operations for which catalog 214 stores respective associated query templates. In other words, catalog 214 may only store the query templates for data operations that are included in and executable by result assembler 216. Result assembler 216 may execute the selected data operation(s), as specified by the execution plan, against data service 206. Data service 206 may return data to result assembler 216 in response to the selected data operation(s) being executed.

Result assembler 216 may also store and be able to execute post-processing function(s). As discussed above, the execution plan may also contain post-processing function(s) that can be performed on data obtained from data service 206.

Result assembler 216 may execute the post-processing function(s) specified by the execution plan on the data obtained from data service 206. As described above, post-processing function(s) can include filtering and other functions that can be performed on the obtained data in order to satisfy the normalized query.

In one embodiment, the fixed set of data operations that is executable by result assembler 216 may include one or more data operations associated with the Simple Object Access Protocol (SOAP), the Distributed Common Object Model (DCOM), and/or Remote Procedure Call (RPC). For example, a selected data operation may be a SOAP operation that when executed, accesses data service 206.

Result assembler 216 returns query results to request processor 208 for forwarding to requesting entity 202. The query results include the obtained data and/or the post-processed data.

C. Data Service

Data service 206 serves as a back tier of 3-tier data retrieval system 200. Data service 206 may include a database server and one or more databases connected thereto or one or more web services. In an embodiment in which data service 206 comprises a database server, the database server may comprise any type of a database server, including any type of a relational database server, an object/relational database server, an object-oriented database server, etc. As discussed above, data service 206 may be accessed using data operation(s) executed by middle tier 204 (i.e., result assembler 216). In response to receiving data operation(s) from result assembler 216, data service 206 is configured to return data.

Figure 3:
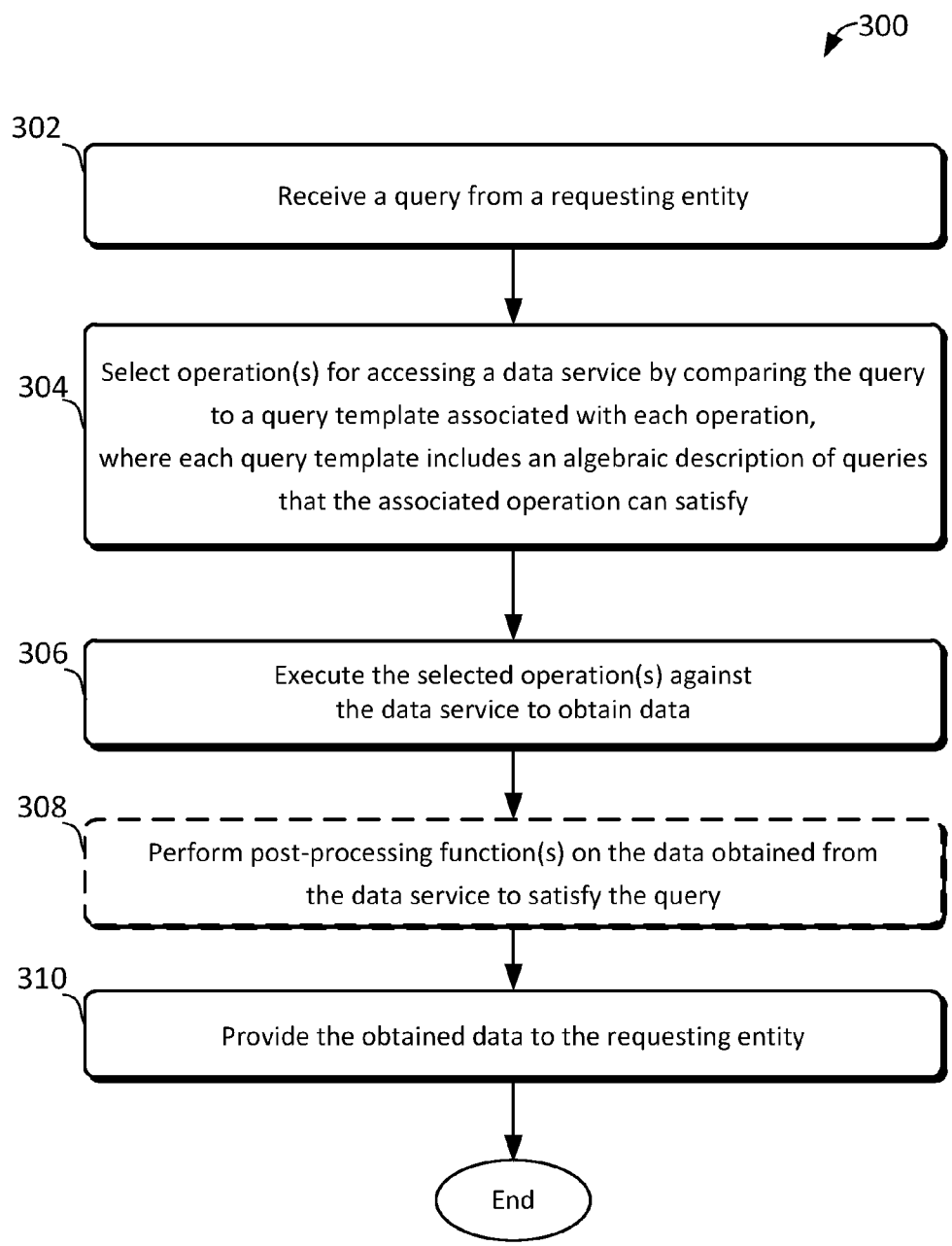
FIG. 3 depicts a flowchart of a data retrieval method that matches queries to data operations using query templates in accordance with an embodiment.

III. Example Methods for Matching Queries to Data Operations Using Query Templates Example methods for matching queries to data operations using query templates in accordance with various embodiments will now be described. In particular, FIG. 3 depicts a flowchart 300 of an example data retrieval method that matches queries to data operations using query templates in accordance with an embodiment. The method of flowchart 300 will now be described with continued reference to system 200 as described above in reference to FIG. 2. However, persons skilled in the relevant art(s) will appreciate that the method of flowchart 300 is not limited to those implementations.

As shown in FIG. 3, the method of flowchart 300 begins at step 302 in which a query is received from a requesting entity. This step may be performed for example by request processor 208 of system 200. As discussed above with reference to system 200, the query may request specified data from a data service, such as data service 206 of system 200. For example, request processor 208 may receive the query from requesting entity 202.

At step 304, data operation(s) are selected from among a fixed set of data operations for accessing the data service by comparing the query to a query template associated with each data operation. Each query template includes an algebraic description of queries that the associated data operation can satisfy. This step can be performed for example by query matcher 212 of system 200.

At step 306, the selected data operation(s) are executed against the data service to obtain data. This step can be performed for example by result assembler 216 of system 200. For example, the selected data operations may be executed by result assembler 216 against data service 206 to obtain data.

At optional step 308, post-processing function(s) can be performed on data obtained from the data service to satisfy the query. This step can be performed for example by result assembler 216 of system 200. For example, the post-processing function(s) may be executed by result assembler 216 on data obtained from data service 206 to satisfy the query.

At step 310, the obtained data is provided to the requesting entity. This step can be performed for example by request processor 208 of system 200. For example, request processor 208 can provide query results that include the obtained data (or the post-processed data) to requesting entity 202.

Figure 4:
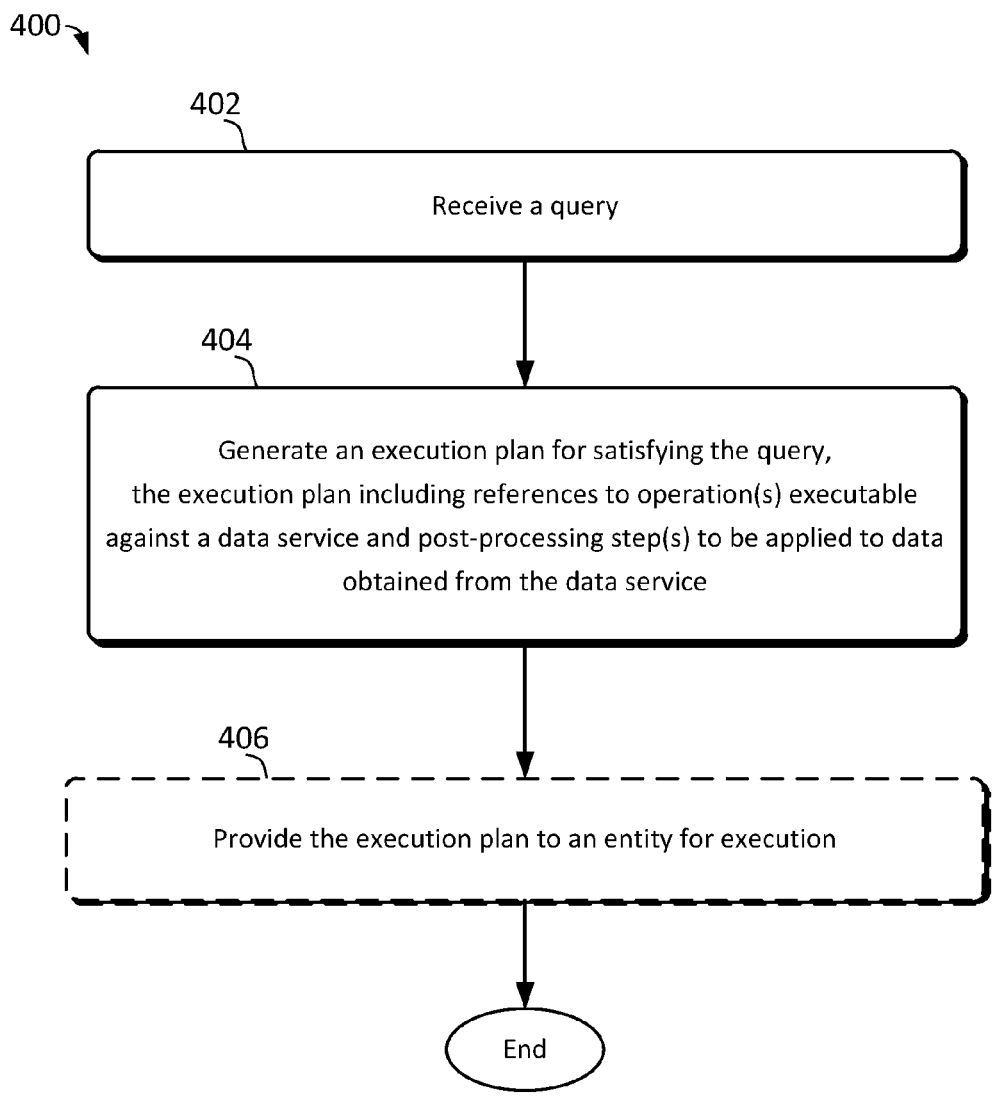
FIG. 4 depicts another flowchart of a method for matching queries to data operations using query templates in accordance with an embodiment.

FIG. 4 depicts a flowchart 400 of another example data retrieval method that matches queries to data operations using query templates in accordance with an embodiment. The method of flowchart 400 will now be described with continued reference to system 200 as described above in reference to FIG. 2. However, persons skilled in the relevant art(s) will appreciate that the method of flowchart 400 is not limited to those implementations.

As shown in FIG. 4, the method of flowchart 400 begins at step 402 in which a query is received. This step may be performed for example by request processor 208 of system 200. As discussed above with reference to system 200, the query may request specified data from a data service, such as data service 206 of system 200.

At step 404, an execution plan is generated for satisfying the query. The execution plan may include references to data operation(s) executable against a data service and post-processing step(s) to be applied to data obtained from the data service. This step may be performed for example by query matcher 212 of system 200. For example, query matcher 212 may generate an execution plan that includes data operation(s) for obtaining data and post-processing step(s) to be performed on the obtained data. The execution plan identifies the data operation(s) based on an extent to which the query matches an algebraic description of queries that can be satisfied by each of the data operation(s).

At optional step 406, the execution plan is provided to an entity for execution. This step can be performed for example by request processor 208 of system 200. For example, request processor 208 may provide the execution plan to result assembler 216 for execution.

IV. Example Computer System Implementations

Figure 5:
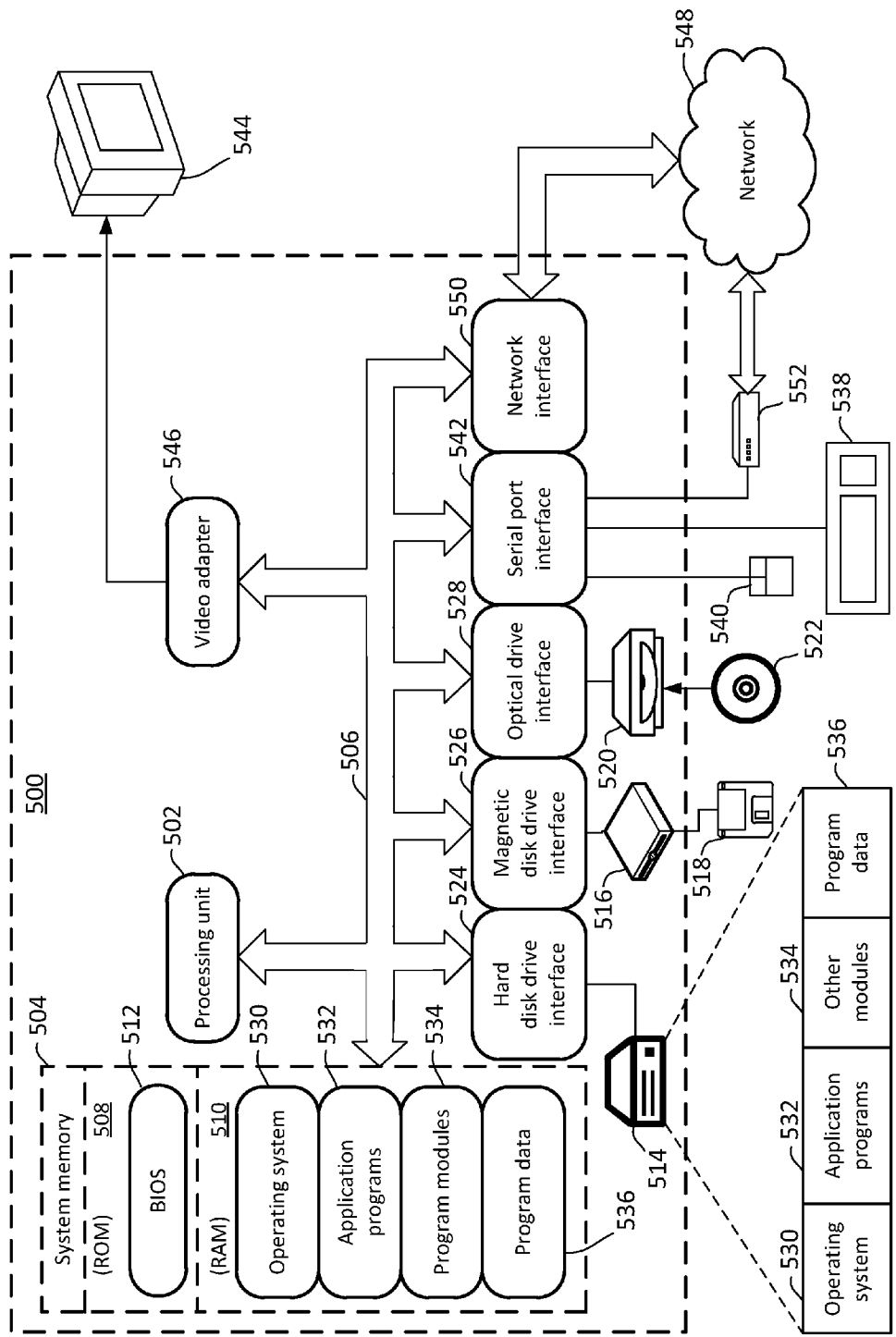
FIG. 5 is a block diagram of an example networked computing system that may be used to implement a method for matching queries to data operations using query templates in accordance with an embodiment.

FIG. 5 depicts an example computer system 500 that may be used to implement a system for matching queries to data operations using query templates in accordance with an embodiment. For example, any of components of three-tier data retrieval system 104 of FIG. 1 or three-tier data retrieval system 200 of FIG. 2 may be implemented using computer system 500. Computer system 500 may represent a general-purpose computing device in the form of a conventional personal computer, a mobile computer, or a workstation, for example, or computer system 500 may be a special purpose computing device. The description of computer system 500 provided herein is provided for purposes of illustration, and is not intended to be limiting. Embodiments may be implemented in further types of computer systems, as would be known to persons skilled in the relevant art(s).

As shown in FIG. 5, computer system 500 includes a processing unit 502, a system memory 504, and a bus 506 that couples various system components including system memory 504 to processing unit 502. Processing unit 502 may comprise one or more processors or processing cores. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer system 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs modules may include one or more of request processor 208, query normalizer 210, query matcher 212, and/or result assembler 216. When executed by processing unit 502, these program modules can perform functions and features described above, including but not limited to any of the steps or functions described above in reference to flowchart 300 of FIG. 3 and flowchart 400 of FIG. 4.

A user may enter commands and information into the computer system 500 through input devices such as keyboard 538 and pointing device 540. Other input devices (not shown) may include a microphone, joystick, game controller, scanner, or the like. In one embodiment, a multi-touch capable touch screen is provided in conjunction with a display 544 to allow a user to provide user input via the application of a touch (as by a finger or stylus for example) to one or more points on the touch screen. These and other input devices are often connected to processing unit 502 through a serial port interface 542 that is coupled to bus 506, but may be connected by other interfaces, such as a parallel port, game port, or a universal serial bus (USB). A display 544 is also connected to bus 506 via an interface, such as a video adapter 546. In addition to the display, computer system 500 may include other peripheral output devices (not shown) such as speakers and printers. Computer system 500 is connected to a network 548 (e.g., a local area network or wide area network such as the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable medium" are used to generally refer to non-transitory media such as the hard disk associated with hard disk drive 514, removable magnetic disk 518, removable optical disk 522, as well as other media such as flash memory cards, digital video disks, random access memories (RAMs), read only memories (ROM), and the like.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of computer system 500.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
  receiving a query from a requesting entity;
  selecting one or more data operations from among a fixed set of data operations for accessing a data service based on the query, the one or more selected data operations partially satisfying the query, the selecting comprising comparing the query to a set of query templates stored in a catalog, each query template in the set of query templates being respectively associated with a data operation in the fixed set of data operations, each query template comprising an algebraic description of queries that the associated data operation can satisfy, the comparing comprising comparing the query to at least one query template that includes an operator that indicates that a portion of the query template is optional when ascertaining whether or not the query template matches the query, the operator enabling the at least one query template to be matched to at least one query that includes the optional portion of the query template and to be matched to at least one query that does not include the optional portion of the query template, the catalog including a cost estimate associated with each data operation, and the selecting further comprising selecting the one or more data operations based in part on the cost estimates so as to minimize a cost associated with selected data operation(s);
  executing the selected data operation(s) against a data service to obtain data therefrom that partially satisfies the query;
  performing one or more post-processing functions on the data obtained from the data service to satisfy the query prior to providing any data to the requesting entity; and
  providing the post-processed data to the requesting entity.

2. The method of claim 1, wherein the query comprises a LINQ expression and wherein comparing the query to the query template associated with each data operation in the fixed set of data operations comprises:
  comparing the LINQ expression to a LINQ expression template associated with each data operation in the fixed set of data operations.

3. The method of claim 1, further comprising:
  normalizing the query prior to the selecting step.

4. The method of claim 1, wherein comparing the query to a query template associated with each data operation in the fixed set of data operations further comprises:
  replacing a designated element of at least one query template with a corresponding element extracted from the query that is identified by the designated element.

5. The method of claim 1, wherein receiving the query from the requesting entity comprises receiving the query from a graphical user interface into which a user enters the query or receiving the query from an application that generates the query.

6. The method of claim 1, wherein performing the one or more post-processing functions on the data obtained from the data service to satisfy the query includes performing a filtering function on the data obtained from the data service to satisfy the query.

7. The method of claim 1, further comprising creating an execution plan that includes the selected data operation(s) and one or more post-processing functions prior to the executing step.

8. A system comprising:
  a request processor configured to receive a query from a requesting entity;
  a query matcher configured to select one or more data operations from among a fixed set of data operations for accessing a data service based on the query, the one or more selected data operations partially satisfying the query, the query matcher being configured to perform the selection by comparing the query to a set of query templates stored in a catalog, the catalog including a cost estimate associated with each data operation, each query template in the set of query templates being respectively associated with each data operation in the fixed set of data operations, each query template comprising an algebraic description of queries that the associated data operation can satisfy, and the query matcher being further configured to select the one or more data operations in a manner that is based in part on the cost estimates so as to minimize a cost associated with the selected data operation(s); and
  a result assembler configured to execute the selected data operation(s) against a data service to obtain data therefrom that partially satisfies the query, and that is further configured to perform one or more post-processing functions on the data obtained from the data service to satisfy the query prior to providing any data to the requesting entity;
  the request processor being further configured to provide the post-processed data to the requesting entity.

9. The system of claim 8, wherein the query comprises a LINQ expression; and
  wherein the query matcher is configured to compare the LINQ expression to a LINQ expression template associated with each data operation in the fixed set of data operations.

10. The system of claim 8, further comprising:
  a query normalizer configured to normalize the query prior to the performance of the selection by the query matcher.

11. The system of claim 8, wherein the query matcher is further configured to replace a designated element of at least one query template with a corresponding element extracted from the query that is identified by the designated element.

12. The system of claim 8, wherein the request processor is configured to receive the query from a graphical user interface into which a user enters the query or from an application that generates the query.

13. The system of claim 8, wherein the result assembler is configured to perform a filtering function on the data obtained from the data service to satisfy the query.

14. The system of claim 8 wherein the query matcher is further configured to create an execution plan that includes the selected data operation(s) and one or more post-processing functions.

15. A computer program product comprising a computer-readable memory device having computer program logic recorded thereon for enabling a processor to perform steps, the steps comprising:

receiving a query from a requesting entity;

selecting one or more data operations from among a fixed set of data operations for accessing a data service based on the query, the one or more selected data operations partially satisfying the query, wherein the selecting comprises comparing the query to a set of query templates stored in a catalog, the catalog including a cost estimate associated with each data operation, each query template in the set of query templates being respectively associated with each data operation in the fixed set of data operations, each query template comprising an algebraic description of queries that the associated data operation can satisfy, the selecting further comprising selecting the one or more data operations in a manner that is based in part on the cost estimates so as to minimize a cost associated with the selected data operation(s);

executing the selected data operation(s) against a data service to obtain data therefrom that partially satisfies the query;

performing one or more post-processing functions on the data obtained from the data service to satisfy the query prior to providing any data to the requesting entity; and providing the post-processed data to the requesting entity.

16. The computer program product of claim 15, wherein the query comprises a LINQ expression and wherein comparing the query to the query template associated with each data operation in the fixed set of data operations comprises:

comparing the LINQ expression to a LINQ expression template associated with each data operation in the fixed set of data operations.

17. The computer program product of claim 15, wherein the steps further comprise:

normalizing the query prior to the selecting step.

18. The computer program product of claim 15, wherein comparing the query to a query template associated with each data operation in the fixed set of data operations further comprises:

replacing a designated element of at least one query template with a corresponding element extracted from the query that is identified by the designated element.

19. The computer program product of claim 15, wherein performing the one or more post-processing functions on the data obtained from the data service to satisfy the query includes performing a filtering function on the data obtained from the data service to satisfy the query.

20. The computer program product of claim 15, wherein the steps further comprise:

creating an execution plan that includes the selected data operation(s) and one or more post-processing functions prior to the executing step.

\* \* \* \* \*